US010442518B2

(12) United States Patent
Larson

(10) Patent No.: US 10,442,518 B2
(45) Date of Patent: Oct. 15, 2019

(54) MOISTURE DIVERSION SYSTEMS AND METHODS OF USING SAME

(71) Applicant: THE BOEING COMPANY, Chicago, IL (US)

(72) Inventor: Mark Lennart Larson, Mukilteo, WA (US)

(73) Assignee: THE BOEING COMPANY, Chicago, IL (US)

( * ) Notice: Subject to any disclaimer, the term of this patent is extended or adjusted under 35 U.S.C. 154(b) by 406 days.

(21) Appl. No.: 15/373,253

(22) Filed: Dec. 8, 2016

(65) Prior Publication Data

US 2018/0162511 A1 Jun. 14, 2018

(51) Int. Cl.
*B64C 1/06* (2006.01)

(52) U.S. Cl.
CPC .............. *B64C 1/066* (2013.01); *B64C 1/067* (2013.01)

(58) Field of Classification Search
CPC ......... B64C 1/066; B64C 1/406; B64C 1/067; B64C 1/143
See application file for complete search history.

(56) References Cited

U.S. PATENT DOCUMENTS

| 3,867,244 | A | * | 2/1975 | Adams | B64C 1/067 428/182 |
| 6,110,567 | A | * | 8/2000 | Bird | B32B 3/28 428/178 |
| 7,677,500 | B2 | * | 3/2010 | Redecker | B64C 1/1453 244/136 |
| 8,936,671 | B2 | * | 1/2015 | Horstman | B64D 13/06 244/118.5 |
| 2008/0282636 | A1 | * | 11/2008 | Roth | B64C 1/066 52/506.01 |
| 2014/0273787 | A1 | * | 9/2014 | McCammon | B64D 13/00 454/76 |
| 2015/0225070 | A1 | * | 8/2015 | Wilander | B64C 1/403 244/131 |
| 2017/0144743 | A1 | * | 5/2017 | Dickson | B64C 1/40 |

* cited by examiner

*Primary Examiner* — Assres H Woldemaryam
(74) *Attorney, Agent, or Firm* — Coats & Bennett, PLLC

(57) ABSTRACT

A moisture diversion system of an aircraft for capturing moisture from at least one internal aircraft structure or at least one gap, the moisture diversion system comprising: a drip shield with an upper surface having a concave shape, at least one moisture channel disposed in the upper surface of the drip shield, the drip shield being in a moisture capturing orientation under the at least one internal aircraft structure or the at least one gap.

19 Claims, 20 Drawing Sheets

MOISTURE DIVERSION SYSTEMS AND METHODS OF USING SAME

FIELD

The present disclosure generally relates to the moisture control field. More particularly, the present disclosure relates to the field of moisture control in a vehicle.

BACKGROUND

In an aircraft, the outer skin is spaced from the walls and ceiling of a passenger cabin (or other compartment), and the gap is at least partially filled with an insulation layer or blanket. The insulation layer is typically formed from a waterproof material. During a flight, liquid from moist air can condense against the skin, particularly at the top of the fuselage, and freeze during cruise. During decent, this frozen liquid can thaw and drip back down towards the cabin. Because the insulation blanket is waterproof, the condensate can typically flow along the insulation blanket and drain into the bilge. However, at some locations, structures and/or supports can protrude through the insulation blanket. For example, the supports that hold monuments and stowage bins to the crown extend from the structure at the skin, through the insulation blanket, and into the cabin. The insulation blankets come with predefined holes for the supports to extend through the blanket. The holes are lined, and there may be a gap defined between the inner surface of the hole and the support. When liquid thaws, it can drip down through the hole and into the cabin.

Further compounding the issue of holes predefined in the blanket, sometimes during maintenance and/or repair the insulation blankets are dislocated from their original intended position and because the blankets are generally flexible with little shape memory, they will not usually return to their intended position naturally. This dislocation of the blanket will sometimes result in a deterioration of the blanket's ability to properly channel liquid moisture towards the bilge at the bottom of the plane fuselage thereby causing liquid moisture to drip towards the passenger cabin.

Previous attempts at controlling undesirable moisture from dripping into the passenger cabin also include using moisture control felt. While the use of the moisture control felt provides an incremental improvement over not using felt at all, it has been discovered that on flights of long duration and/or with many passengers and/or in high humidity environments the moisture control felt can become saturated and at least partially ineffective, resulting in moisture dripping into the passenger cabin.

BRIEF SUMMARY

There is provided, a moisture diversion system of an aircraft for capturing moisture from at least one internal aircraft structure or at least one gap, the moisture diversion system comprising: a drip shield with an upper surface having a concave shape, at least one moisture channel disposed in the upper surface of the drip shield, the drip shield being in a moisture capturing orientation under the at least one internal aircraft structure or the at least one gap. In an aspect, the system further comprises a trough comprising an outboard wall and an inboard wall, the outboard wall and the inboard wall defining a recessed liquid conduit therebetween, the trough disposed substantially perpendicular to, and in fluid communication with, a lower segment or a bottom portion of the drip shield; coupled in fluid communication with the trough, a drain including a drain aperture extending into the liquid conduit to draw moisture from the liquid conduit into the drain; and a drain tube connected in fluid communication to the drain for routing moisture away from a passenger cabin of the aircraft.

In an aspect, the moisture diversion system further comprises a trough comprising an outboard wall and an inboard wall, the outboard wall and the inboard wall defining a recessed liquid conduit therebetween, the trough disposed substantially perpendicular to, and in fluid communication with, a lower segment or a bottom portion of the drip shield.

In an aspect, the moisture diversion system further comprises a drain coupled in fluid communication with the trough, the drain including a drain aperture extending into the liquid conduit to draw moisture from the liquid conduit into the drain.

In an aspect, the moisture diversion system further comprises a drain tube connected in fluid communication to the drain for routing moisture away from a passenger cabin of the aircraft.

In an aspect, the moisture diversion system further comprises comprising a drain stop disposed on at least one of the outboard wall and the inboard wall of the trough such that the drain stop extends down into the liquid conduit to obstruct moisture flow within the liquid conduit.

In an aspect, the at least one moisture channel comprises a plurality of moisture channels, the system further comprising a central bead disposed between two moisture channels of the plurality of moisture channels.

In an aspect, the moisture diversion system further comprises a central bead defined on the upper surface of the drip shield, the central bead comprising a first central bead portion and a second central bead portion, wherein a break is between the first central bead portion and the second central bead portion.

In an aspect, the moisture diversion system further comprises at least one joggle in the drip shield.

In an aspect, the drip shield is tubular shaped and includes an open slot facing the at least one internal aircraft structure or at least one gap.

In an aspect, the moisture diversion system further comprises a wicking necklace disposed in fluid communication with the at least one internal aircraft structure or at least one gap and the drip shield, the wicking necklace configured to wick moisture from the at least one internal aircraft structure or at least one gap into the drip shield.

In an aspect, the drip shield comprises a plurality of segments. In an aspect, at least two of the plurality of segments are attached together. In an aspect, the drip shield comprises an upper segment, a middle segment, and a lower segment.

In an aspect, the moisture diversion system further comprises a hole disposed in a junction of two of the segments for passage of an internal aircraft structure therethrough. In an aspect, a bead extends around the hole.

In an aspect, the moisture diversion system further comprises at least one slot disposed in the upper segment for mounting the drip shield to a second internal aircraft structure.

In an aspect, the moisture diversion system further comprises at least one snap flange disposed on the at least one slot and biased upwardly, the at least one snap flange configured to snap the upper segment onto the second internal aircraft structure.

In an aspect, the drip shield includes fasteners to fasten the drip shield directly to an insulation blanket.

There is further provided, a method of using a moisture diversion system for capturing moisture from an internal aircraft structure using at least one drip shield in a moisture capturing location relative to the internal aircraft structure, the method comprising: capturing moisture from the internal structure in the at least one drip shield; and, transporting the captured moisture in the at least one drip shield.

In an aspect, the method of using a moisture diversion system further comprises collecting captured moisture in a trough comprising an outboard wall and an inboard wall, the outboard wall and the inboard wall defining a recessed liquid conduit therebetween, the trough disposed substantially perpendicular to, and in fluid communication with, a lower segment or a bottom portion of the drip shield; directing moisture in the trough to at least one drain, the drain coupled in fluid communication with the trough and including a drain aperture extending into the liquid conduit to draw moisture from the liquid conduit into the drain; and routing moisture from the drain to a drain tube connected in fluid communication to the drain for routing moisture away from a passenger cabin of the aircraft.

Unless otherwise defined, all technical and/or scientific terms used herein have the same meaning as commonly understood by one of ordinary skill in the art to which the disclosure pertains. Although methods and materials similar or equivalent to those described herein can be used in the practice or testing of aspects of the disclosure, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some aspects of the disclosure are herein described, by way of example only, with reference to the accompanying drawings. With specific reference now to the drawings in detail, it is stressed that the particulars shown are by way of example, are not necessarily to scale, and are for purposes of illustrative discussion of aspects of the disclosure. In this regard, the description taken with the drawings makes apparent to those skilled in the art how aspects of the disclosure may be practiced.

DETAILED DESCRIPTION

Figure 1:
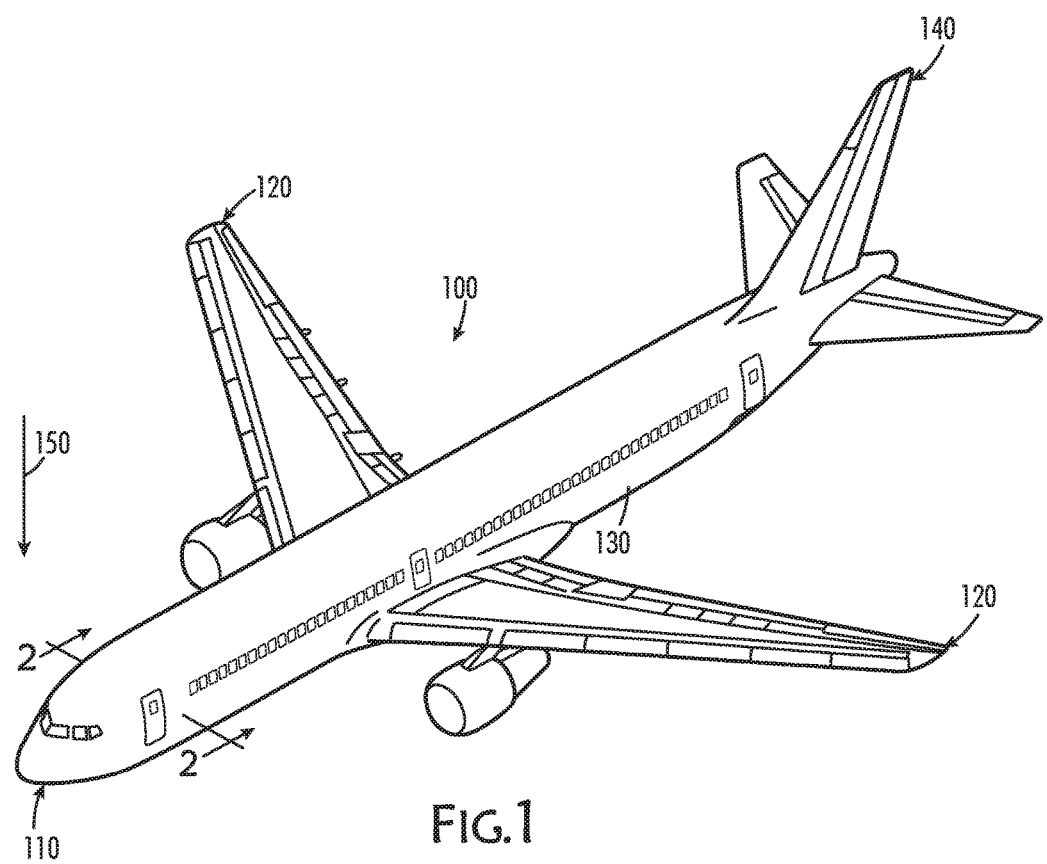
FIG. 1 is a schematic diagram of an aircraft.

The present disclosure generally relates to the moisture control field. More particularly, the present disclosure relates to the field of moisture control in a vehicle.

Before explaining at least one aspect of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other aspects or of being practiced or carried out in various ways.

Figure 2:
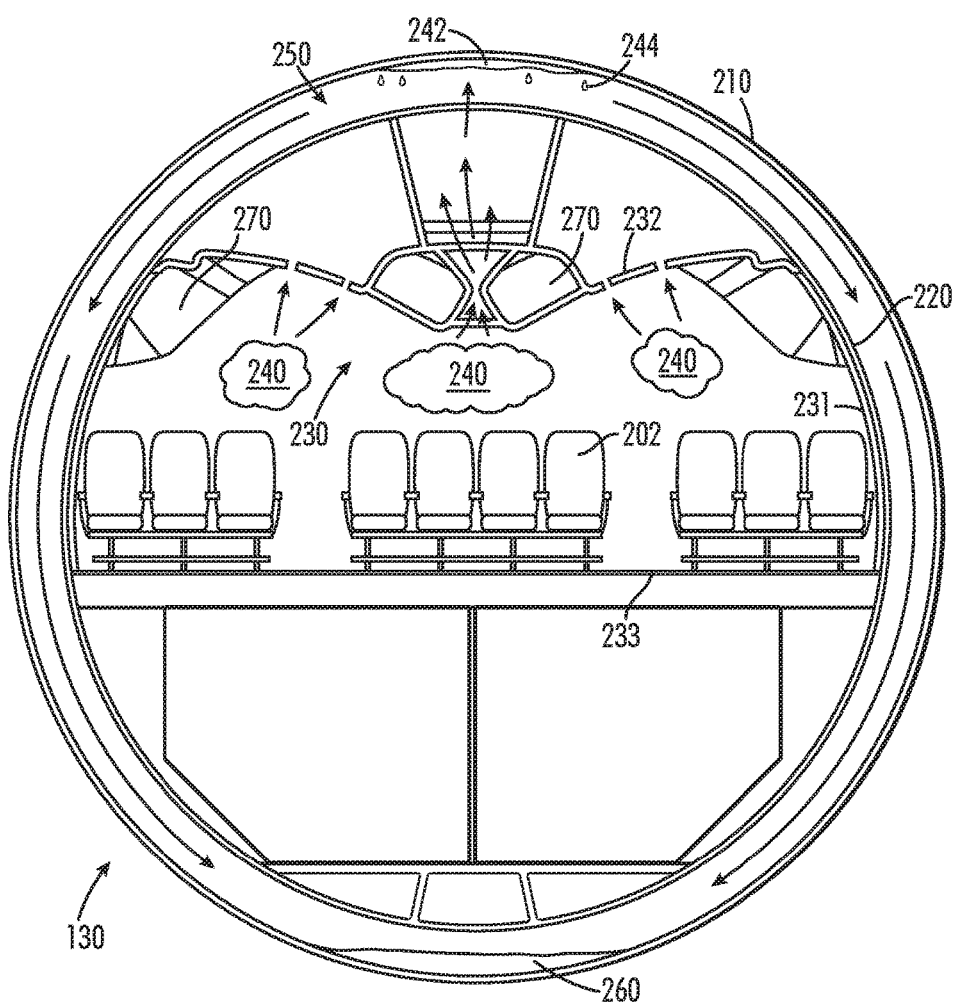
FIG. 2 is an exemplary cross-sectional, schematic view of the aircraft shown in FIG. 1.

FIGS. 1 and 2 illustrate an exemplary aircraft and exemplary moisture flow within an exemplary aircraft, and FIGS. 3-20 show exemplary moisture diversion systems, or components thereof, for preventing or at least minimizing moisture flow into an inner cabin portion of the aircraft, according to some aspects of the disclosure. FIG. 1 shows an aircraft 100 that includes a nose 110, wings 120, a fuselage 130, and a tail 140. FIG. 1 also illustrates a downward arrow 150 indicating the expected direction in which the force of gravity will pull objects, such as liquid water, onboard an aircraft 100 in a nominal operational profile. As used herein, "down", "downward" and "bottom" generally correspond to the direction of arrow 150, while "up", "upper" and "top" are generally in the opposite direction of the arrow 150.

FIG. 2 is a cross-sectional, schematic view of the aircraft 100 indicated by view arrows 2 in FIG. 1. FIG. 2 illustrates a portion of the aircraft fuselage 130, simplified for easier understanding of this Description. The fuselage 130 includes side walls 231, a ceiling 232, and a floor 233, which define the passenger cabin 230. Passengers in the aircraft 100 may congregate in seats 202 of the cabin 230 during flight. FIG. 2 illustrates that, inside of the fuselage 130 (e.g. in cabin 230), respiration and other sources of water cause moisture 240 to enter or form in the air in the cabin 230. For example, warm exhaled air includes moisture 240 and rises upward through luggage compartments/stowage bins 270. Some of this warm and moist air rises through the ceiling 232. Furthermore, some warm air continues to rise upward through an insulation layer 220 (or insulation blanket) into a space 250 between the insulation layer 220 and an outer wall 210 of the aircraft, also known as the aircraft skin, particularly in the crown/upper area of the fuselage.

Figure 4:
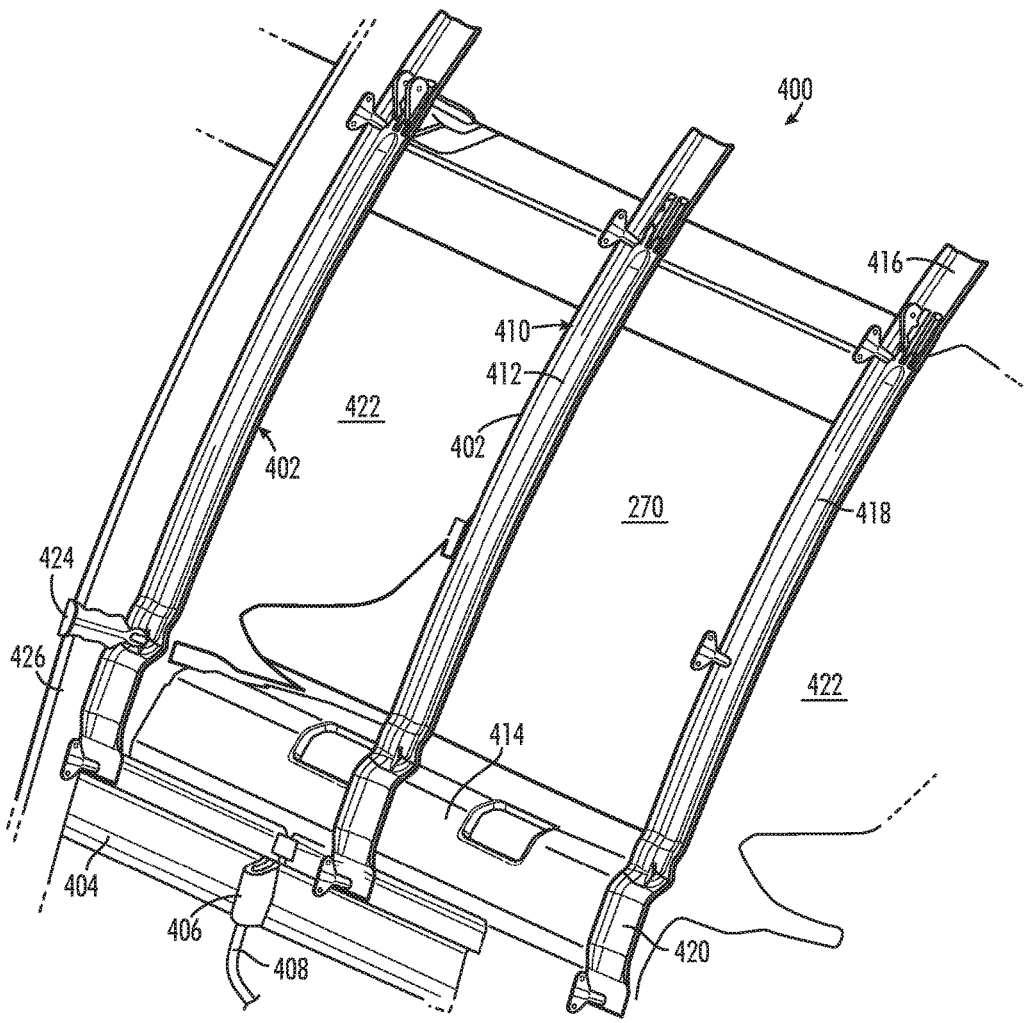
FIG. 4 is a perspective, partial view of the moisture diversion system shown in FIG. 3.

As the skin 210 is cooled by the outside air at high altitude during flight, the temperature of the skin 210 eventually decreases to a temperature below the freezing temperature of water. This cooling causes moisture 240 (e.g., water) to condense out of the air in the space 250 and freeze onto the inner surface of the skin 210 as ice 242. As the aircraft changes to a lower altitude and/or commences descent for landing and the temperature increases, the ice 242 can begin to melt causing moisture droplets 244 to travel through the space 250 towards the bottom 260 of the fuselage 130, drawn by gravity 150. Some moisture droplets 244 enter gaps in the insulation layer 220, drip on top of structures in the fuselage, such as the ceiling 232 and the stowage bins 270, and subsequently into the cabin 230. The size of the space 250 has been exaggerated somewhat in FIG. 2 in order to more clearly show the details of the structure. For simplicity, common aircraft load bearing components such as stringers and/or frame members are not shown in FIG. 2, but examples are shown in FIG. 4, inter alia.

Figure 3:
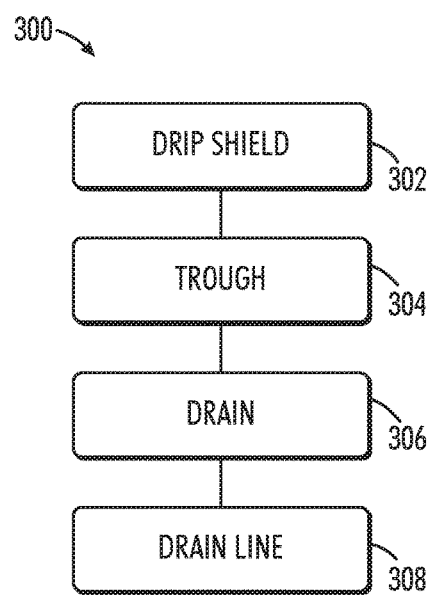
FIG. 3 is a block diagram of an exemplary moisture diversion system.

FIG. 3 is a generalized block diagram of a moisture diversion system 300 that can be used with the aircraft 100 shown in FIGS. 1 and 2. Moisture diversion systems 400, 1700, 1900, 2000 described herein with respect to FIGS. 4, 17, 19, and 20, inter alia, set forth specific moisture diversion system configurations of generalized moisture diversion system 300. For example, exemplary drip shields 402, 500, 600, 800, 1702, 1902, 2002 can be used as drip shield 302 and are shown and described in more detail with respect to FIGS. 4-8, 17, 19 and 20, inter alia, but it should be understood that these drip shields are by way of example only and that virtually any structure capable of catching and directing moisture flow could conceivably be used as a "drip shield" 302 in the moisture diversion system 300, or any of the specific moisture diversion systems described herein.

Generally, the moisture diversion systems described herein are configured to prevent, or at least diminish, the possibility of liquid moisture dripping through or down internal aircraft structures like frames, stringers, insulation blankets, fittings, and/or brackets and into the cabin 230. The moisture diversion system 300 includes at least one drip shield 302 to provide fluidic communication between an internal aircraft structure where moisture drips down or through and a portion of the aircraft 100 where the moisture cannot intrude into the cabin 230, for example the bottom 260 of the fuselage. In some aspects, the drip shield 302 is positioned in a moisture capturing orientation under a potential source of inboard moisture intrusion, for example a gap in an insulation blanket, to capture the moisture and/or route the captured moisture away from the cabin 230 to prevent, or at least reduce, moisture ingress into the cabin 230. In an aspect, "moisture capturing orientation" means with the drip shield 302 under the internal aircraft structure where liquid moisture subject to gravity and/or aircraft vibration would drip substantially in direction 150 and into the drip shield 302.

In an aspect, usage of a moisture diversion system such as those described herein reduces or eliminates the need for moisture absorbing felt, which is conventionally used to capture unwanted moisture, but often ineffectually or only partially.

Figure 9:
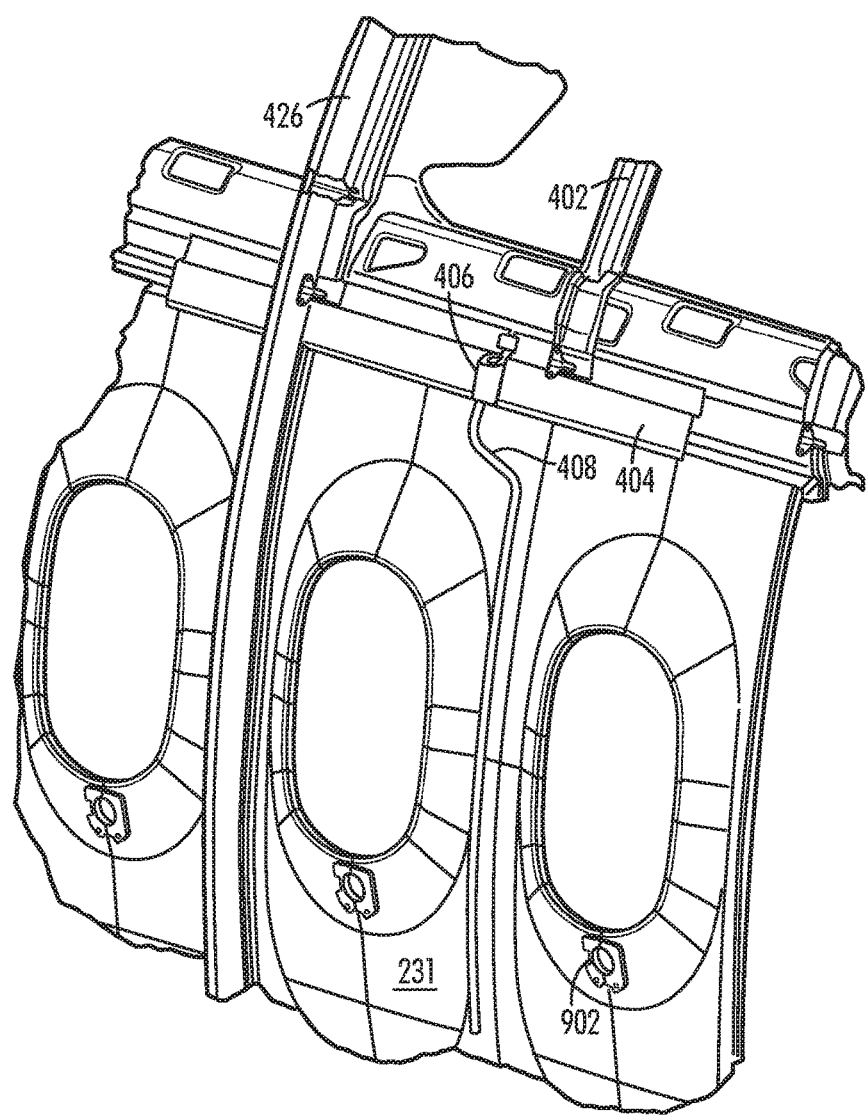
FIG. 9 is a perspective view of a drain line portion of a moisture diversion system of FIGS. 3 and 4.
Figure 10:
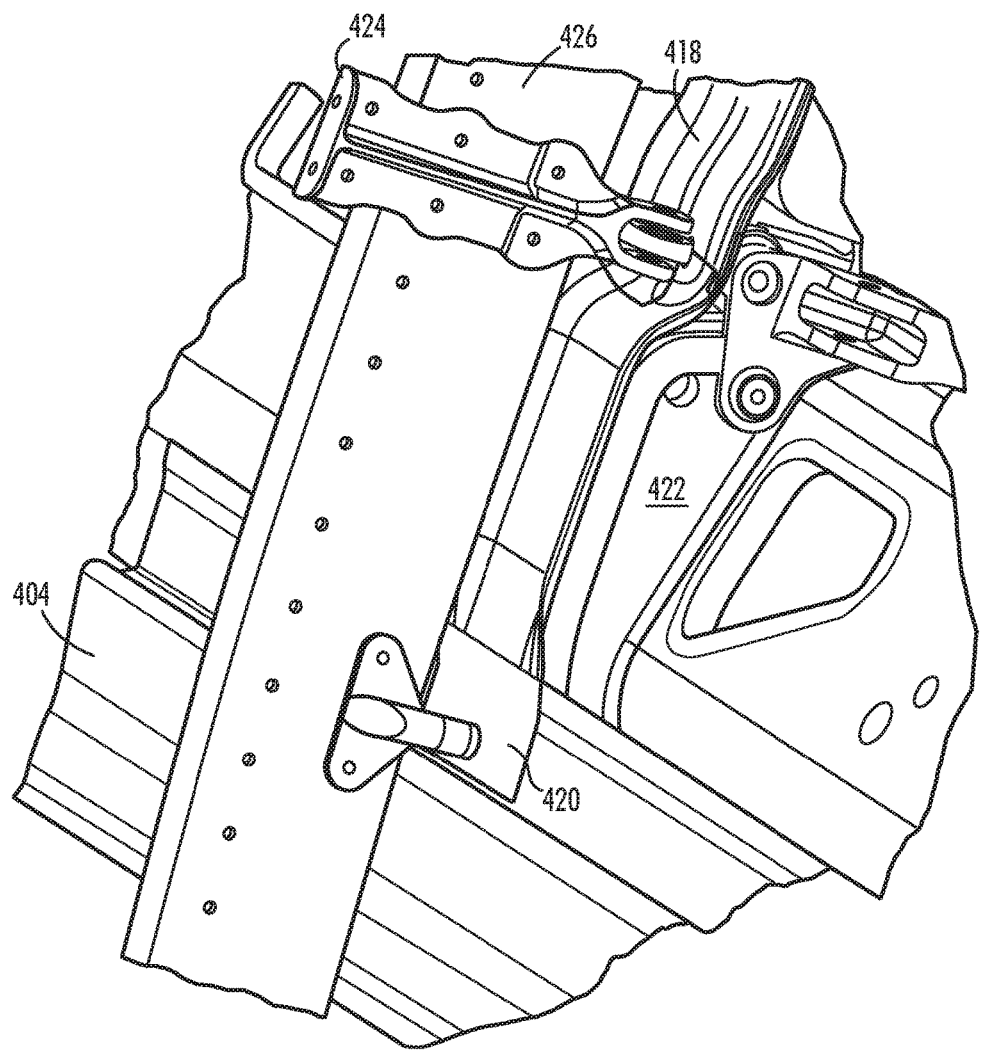
FIG. 10 is a perspective view of a lower segment of a drip shield of a moisture diversion system of FIGS. 3 and 4.
Figure 11:
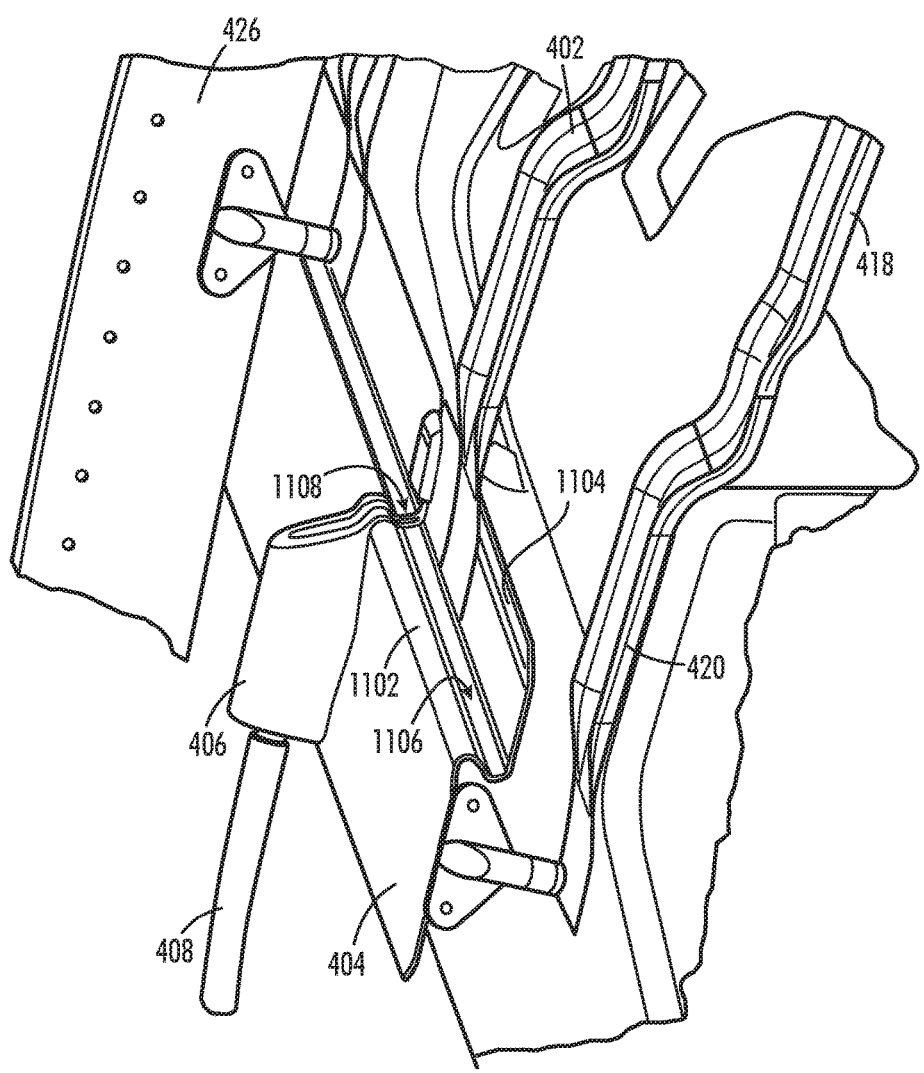
FIG. 11 is a perspective view of a trough and drain of a moisture diversion system of FIGS. 3 and 4.

In some aspects, the moisture diversion system 300 is provided with at least one trough 304, with a specific example of trough 404 shown and described in more detail with respect to FIGS. 4, 10 and 11, to collect moisture running down from at least one drip shield 302. In some aspects, the at least one trough 304 directs collected moisture to at least one drain 306, with a specific example of a drain 406 shown and described in more detail with respect to FIGS. 4, 9 and 11. In some aspects, the drain 306 is connected to at least one drain line 308, with a specific example of a drain line 408 shown and described in more detail with respect to FIGS. 4, 9 and 11. The drain line 308 directs moisture collected by the moisture diversion system 300 downstream towards a bilge located near the bottom 260 of the fuselage 130, which pumps the moisture into a storage reservoir. It should be understood that at least some of the components described herein, for example the trough 304, the drain 306, and/or the drain line 308, are optional and that the moisture diversion systems described herein could be configured to route moisture away from the cabin 230 without some or all of them. It should also be understood that all of the components described herein of the moisture diversion system 300 are disposed to be in fluid communication with the component upstream and the component downstream, if one exists. For example, the drip shield 302 is disposed in fluid communication with the trough 304, and so on.

FIG. 4 is a perspective, partial view of an exemplary moisture diversion system 400. The moisture diversion system 400 includes at least one drip shield 402. In some aspects, the moisture diversion system 400 also includes at least one trough 404, at least one drain 406, and/or at least one drain line 408. In an aspect, at least one drip shield 402 is installed under a gap in an insulation blanket (not shown) to collect moisture penetrating through the gap, from outboard of the insulation blanket to inboard, and direct the moisture down the drip shield 402 to the trough 404, into the drain 406, and, subsequently into the drain line 408, whereupon the moisture is routed to a portion of the aircraft 100 where the moisture cannot enter the cabin 230.

Figure 13:
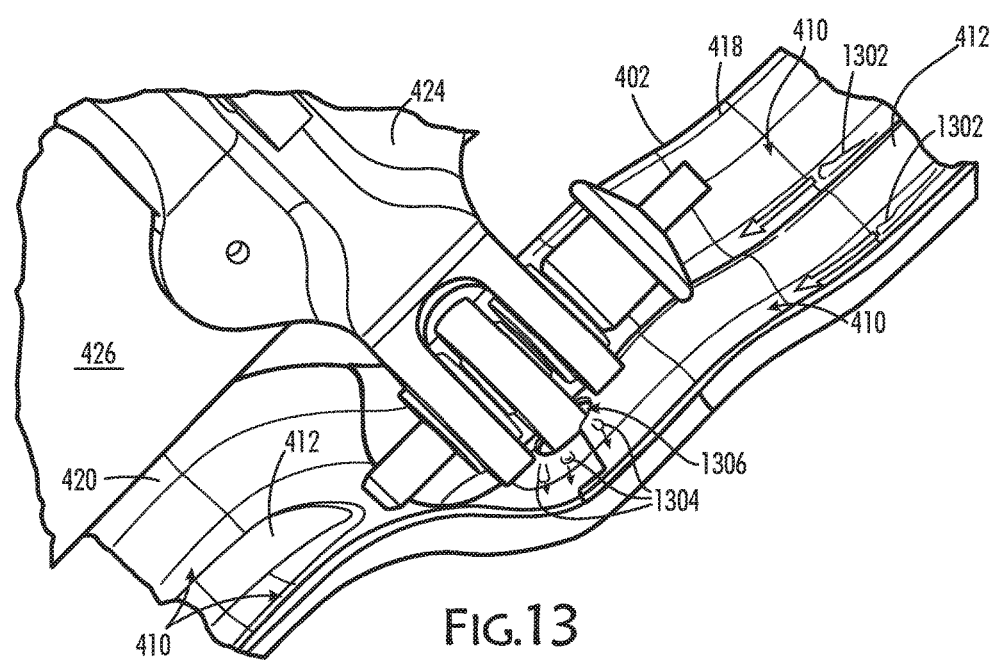
FIG. 13 is close-up, perspective view of exemplary moisture flow in an exemplary drip shield of a moisture diversion system of FIGS. 3 and 4 and around a fitting.
Figure 14:
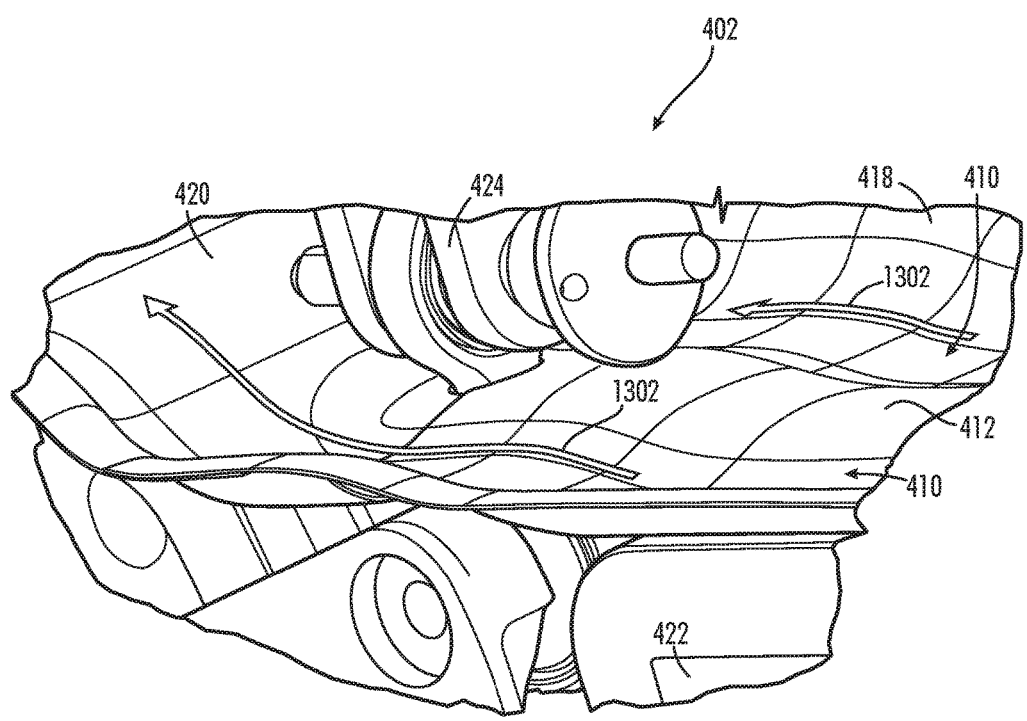
FIG. 14 is a close-up, perspective view of a junction, between a lower segment of a drip shield and a middle segment of a drip shield of a moisture diversion system of FIGS. 3 and 4, at a fitting.

The drip shield 402 is configured with at least one moisture channel 410 for routing captured moisture away from the cabin 230. In some aspects, the drip shield 402 is linear and/or elongated, for example to increase moisture capturing area under a row of internal aircraft structures or gaps and/or to provide a moisture transporting structure to direct captured moisture away from the internal aircraft structure and/or in an outboard direction away from the passenger cabin 230. In some aspects, the drip shield 402 is generally concave-shaped on an upper surface of the drip shield 402, the upper surface being the surface which faces the internal aircraft structures for capturing dripping moisture when the drip shield 402 is in moisture capturing orientation. In some aspects, the moisture channel 410, disposed on the upper surface of the drip shield 402, is contoured to enhance fluid flow therein, and/or to minimize moisture escape from the moisture channel 410. For example, a central bead 412 is provided in the middle of the moisture channel 410 for diverting moisture away from any holes in the drip shield 402, such as shown in FIGS. 13 and 14 where a fitting penetrates the drip shield 402. The central bead 412 can keep an insulation blanket lifted away from the moisture channel 410 to ensure unobstructed moisture flow in the moisture channel 410 and/or help stiffen the drip shield 402 where the bead 412 traverses over structures of the aircraft 414. In some aspects, the drip shield 402 is comprised of three separate but attachable segments, an upper segment 416 (shown and described in more detail with respect to FIG. 15), a middle segment 418, and a lower segment 420 (shown and described in more detail with respect to FIGS. 10 and 11).

In some aspects, the drip shield 402 is constructed of fiberglass, or a thermal plastic, or similar water-proof material. In some aspects, the drip shield 402 is constructed of a slightly flexible material and/or is configured with a thickness which allows some flexibility of the drip shield 402. In some aspects, the drip shield 402 is constructed of a light weight material, for example no more than 15 lbs. (about 6.8 kg) per airplane. In some aspects, the drip shield 402 is between 5 in. and 10 in. (about 12.7 cm to 25.4 cm) wide and between 10 in. and 30 in. (about 25.4 cm to 76.2 cm) long, although different shapes and sizes of drip shield could be used depending on the perceived risk of moisture intrusion.

Figure 12:
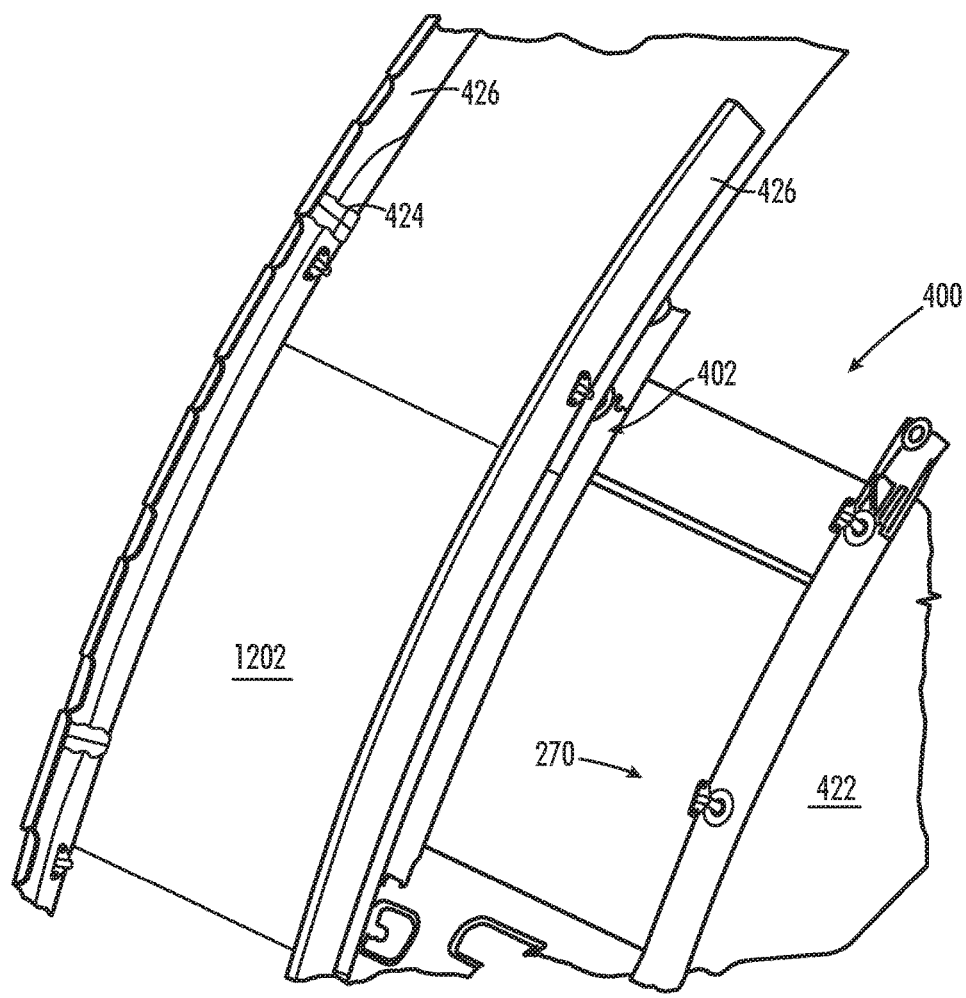
FIG. 12 is a perspective view of an exemplary installed moisture diversion system of FIGS. 3 and 4 in relation to an insulation blanket.

In some aspects, a moisture diversion system, for example moisture diversion system 400, is installed any place in the aircraft's 100 infrastructure where there are penetrations of internal aircraft structures which traverse inboard from the space 250 towards the cabin 230. For example, the moisture diversion system 400 is shown in FIGS. 4 and 12, inter alia, where strongbacks 422 of stowage bin 270 are located because the strongbacks 422 are attached by fittings 424 to stringers and/or frame members 426. The fittings 424 penetrate the insulation layer 220 to connect the frame member 426 to the strongback 422, thereby creating gaps in the insulation blanket/layer for moisture to exploit.

Figure 5:
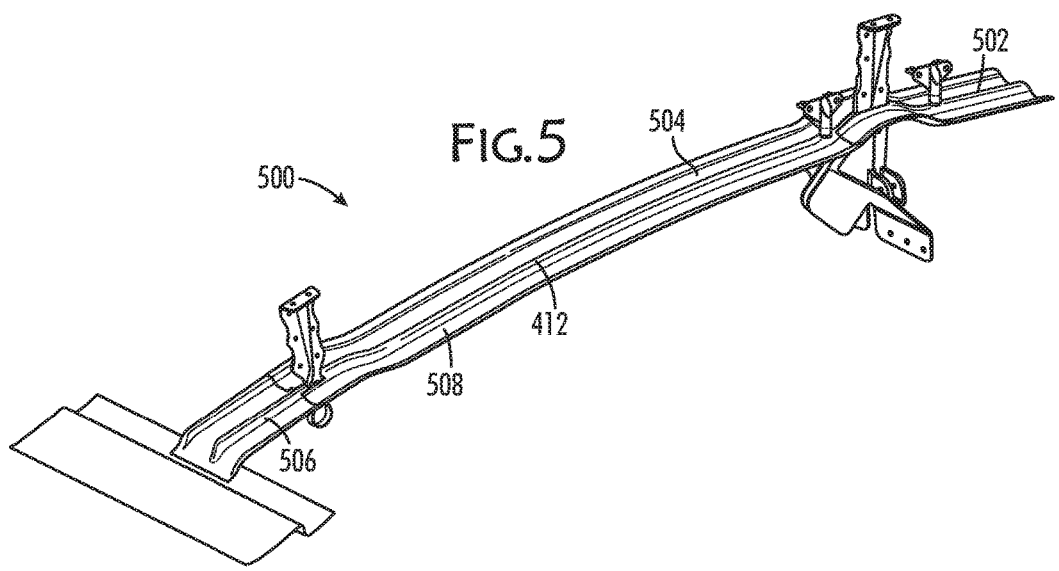
FIG. 5 is a perspective view of an exemplary drip shield that can be used with the moisture diversion system of FIGS. 3 and 4.

FIG. 5 is a perspective view of an exemplary drip shield 500, which could be used as drip shield 302 in the generalized moisture diversion system 300. In an aspect, the drip shield 500 comprises three discrete sections, an upper segment 502, a middle segment 504 and a lower segment 506. Two or more segments are attached to each other in some aspects, for example using tape, adhesive, snaps, and/or interlocking counterparts located on the segments themselves. In an aspect, the drip shield 500 is contoured to facilitate moisture flow therein, for example configured with at least one central bead 412 and at least one moisture channel 508.

Figure 6:
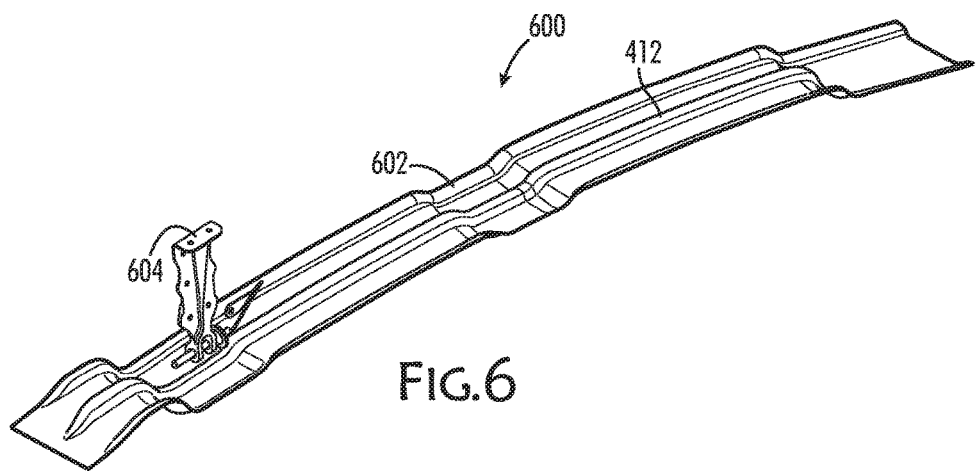
FIG. 6 is a perspective view of an exemplary drip shield with at least one joggle that can be used with the moisture diversion system of FIGS. 3 and 4.
Figure 7A:
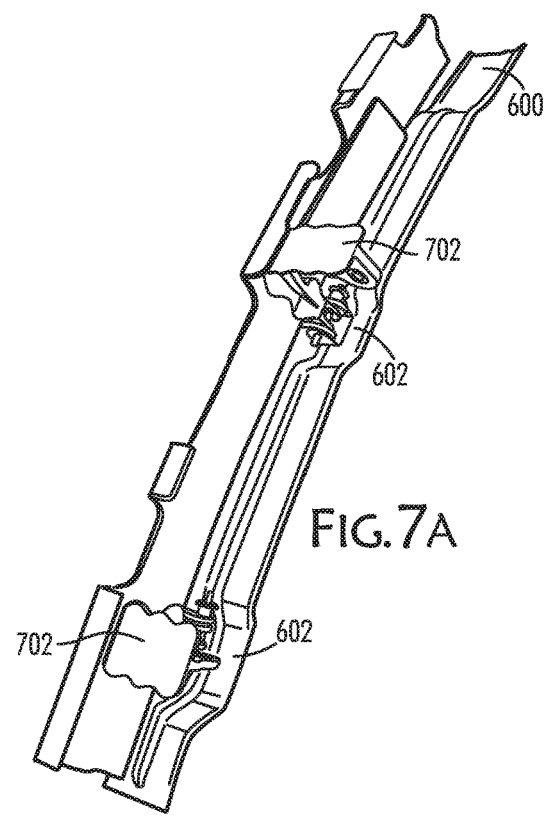
FIGS. 7A-7B are perspective views of an exemplary installed drip shield with at least one joggle of FIG. 6.
Figure 7B:
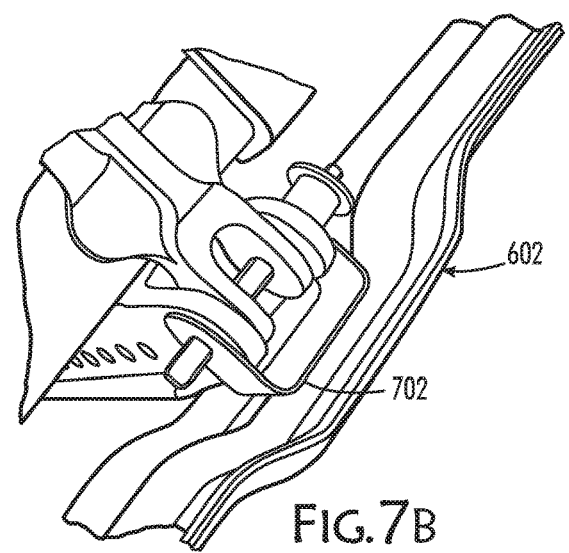

FIG. 6 is a perspective view of an exemplary drip shield 600, which could be used as drip shield 302 in the generalized moisture diversion system 300, with at least one joggle 602. In an aspect, at least one joggle 602 disposed in the drip shield 600 to avoid internal aircraft structures past which the shield 600 traverses. For example, the joggle(s) are configured to accommodate the fitting 604 and/or the fittings 702 (shown in FIGS. 7A and 7B). It should be noted that drip shield 600 is shown as being constructed from a single piece, and is not three-piece like drip shields 402, 500, however, for nearly all of the drip shield iterations and variations described herein, the drip shield 600 can be comprised of any number of segments and can include one, some, or all of the features described herein, for example at least one joggle or at least one break 802 in the central bead 412, in one, some, or all segments.

Figure 8:
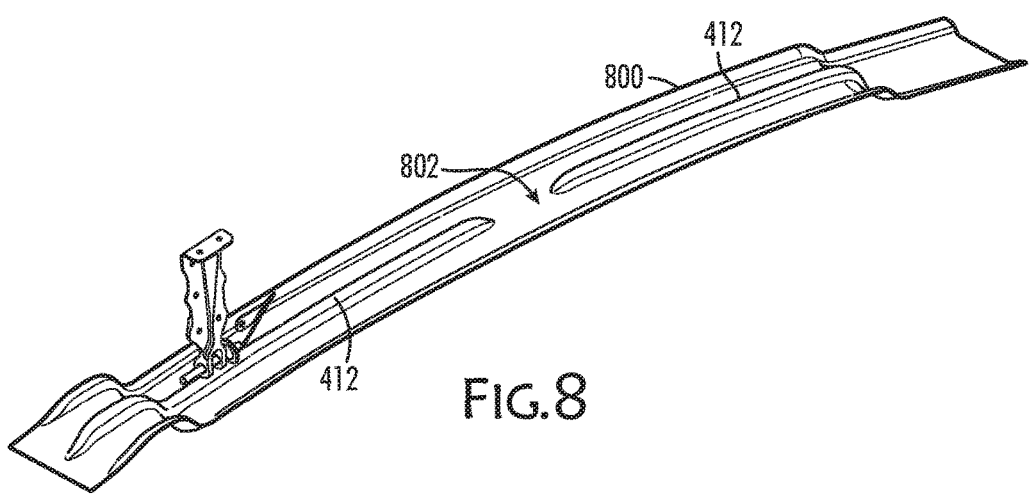
FIG. 8 is a perspective view of an exemplary drip shield with at least one central bead break that can be used with the moisture diversion system of FIGS. 3 and 4.

FIG. 8 is a perspective view of an exemplary drip shield 800, which could be used as drip shield 302 in the generalized moisture diversion system 300, with at least one break 802 between adjacent central beads 412. In an aspect, the break 802 is used to accommodate fittings or structures (similarly to the joggle 602), but for less intrusive or prominent structures than when the joggle 602 is used. For example, a break 802 instead of a joggle 602 is used where a fitting does not extend sufficiently into the path of the drip shield 800 such that a larger path deviation (i.e. a joggle) of the drip shield is needed.

FIG. 9 is a perspective view of an exemplary drain line 408 of the moisture diversion system 400. In an aspect, the drain 406 collects moisture flowing from the drip shield 402 and the trough 404 and directs it into the drain line 408 which transports the moisture down the fuselage 130 outboard of the side wall 231. In an aspect, the drain line 408 is shaped substantially like a tube. Optionally, the drain line 408 is flexible and/or bendable, for example to assist with navigating through and/or around aircraft 100 structures/features (such as windows). The drain line 408 extends sufficiently down the fuselage 130 such that moisture discharged from the drain line 408 will be transported by gravity down and away from the cabin 230, for example towards the bottom 260 of the fuselage 130. The drain line 408 ends below a window dimmer switch 902, in some aspects.

FIG. 10 is a perspective view of a lower segment 420 of the drip shield 402 of the moisture diversion system 400. In an aspect, the lower segment is configured to extend the drip shield 402 around and/or past internal aircraft structures, for example the strongback 422. FIG. 10 also shows that the lower segment 420 and the middle segment 418 intersect where the fitting 424 penetrates through the drip shield 402, such that in a retrofitting scenario, the drip shield 402 can be installed without having to disconnect the fitting 424 (i.e. each segment is inserted on either side of the fitting and then attached together). In some aspects, the drip shield 402 is shaped and/or positioned such that it intersects with the fitting 424 where the fitting 424 has a narrow cross-section.

FIG. 11 is a perspective view of the trough 404 and drain 406 of the moisture diversion system 400, including the drain line 408. The lower segment 420 or bottom portion (for example, if the drip shield is one-piece) of the drip shield 402 delivers, in fluid communication, moisture collected by the drip shield 402 into the trough 404, which is then routed into the drain 406. In an aspect, the trough 404 is longitudinal and comprises an outboard wall 1102 and an inboard wall 1104 which define a recessed liquid conduit 1106 between them. In some aspects, the trough 404 is disposed substantially perpendicular to the drip shield(s) 402. In some aspects, the drain 406 is configured with a drain aperture 1108 which extends into the liquid conduit 1106 to draw moisture from the liquid conduit 1106 into the drain 406.

FIG. 12 is a perspective view of an exemplary installed moisture diversion system 400 in relation to an exemplary insulation blanket layer 1202. In some aspects, drip shields 402 are installed inboard of frame members 426 and the insulation blanket layer 1202 but outboard of stowage bin strongbacks 422.

FIG. 13 is close-up, perspective view of exemplary moisture flow 1302, 1304 in an exemplary drip shield 402 and around a fitting 424. As described elsewhere herein, particularly with respect to FIG. 4, the central bead 412 creates two moisture channels 410, similar to gutters, on either side of the central bead 412 to provide for unobstructed moisture flow 1302 down the drip shield 402 and away from the cabin 230. The central bead 412 extends past where the fitting 424 penetrates the drip shield 402 to divert moisture flow away from a hole 1306 created where the fitting 424 passes through. The central bead 412 extending past the fitting 424 is also useful for diverting moisture flow 1304 dripping from the fitting 424 itself into the moisture channels 410 and away from the hole 1306.

FIG. 14 is a close-up, perspective view of a junction, between the lower segment 420 and the middle segment 418 of the drip shield 402 of moisture diversion system 400, at a fitting 424. FIG. 14 provides an alternative view to FIG. 13 of the moisture flow 1302 down the moisture channels 410 and around the fitting 424.

Figure 15:
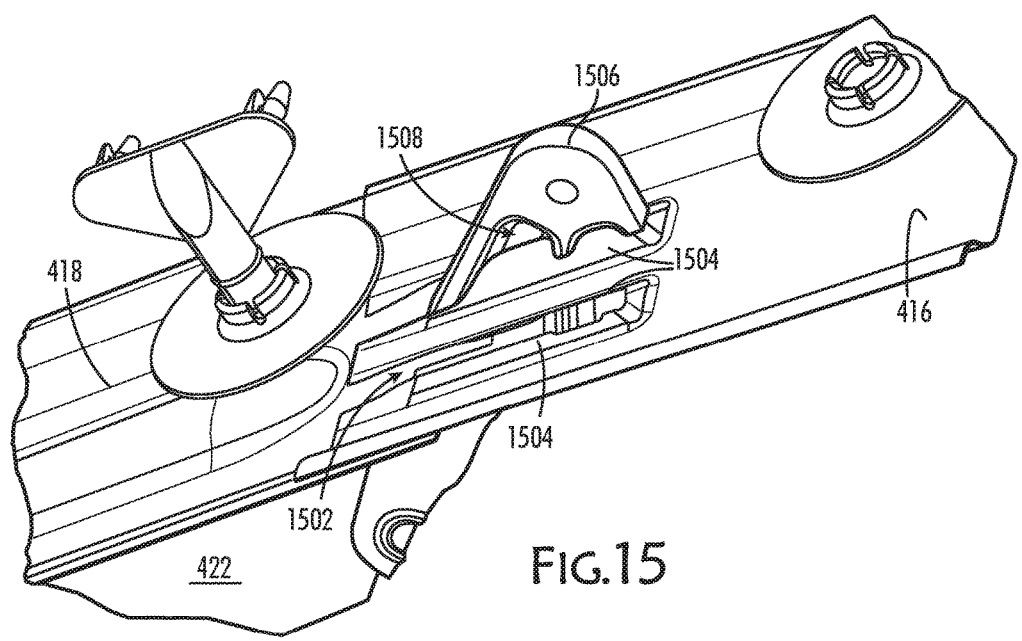
FIG. 15 is a close-up, perspective view of a junction between an upper segment of a drip shield and a middle segment of a drip shield of a moisture diversion system of a moisture diversion system of FIGS. 3 and 4.

FIG. 15 is a close-up, perspective view of a junction between the upper segment 416 of the drip shield 402 and the middle segment 418 of the drip shield 402 of a moisture diversion system 400. In an aspect, at least a portion of the upper segment 416 is provided with at least one slot 1502 configured as a counterpart to a stowbin upper attachment fitting 1506, such that the stowbin upper attachment fitting 1506 projects through the slot 1502 and the drip shield 402 is reversibly attached to the stowbin upper attachment fitting 1506 by an upwardly biased flange 1504 which snaps into at least one recess 1508 on stowbin upper attachment fitting 1506. In an aspect, the drip shield 402 can be detached from stowbin upper attachment fitting 1506 by unsnapping the upwardly biased flange 1504 from the at least one recess 1508. It should be noted that for clarity, only one stowbin upper attachment fitting 1506 is shown but that in some aspects there are actually two or more. Optionally, there are none. There is a slot 1502 provided in the drip shield 402 for each stowbin upper attachment fitting 1506, in an aspect.

Figure 16:
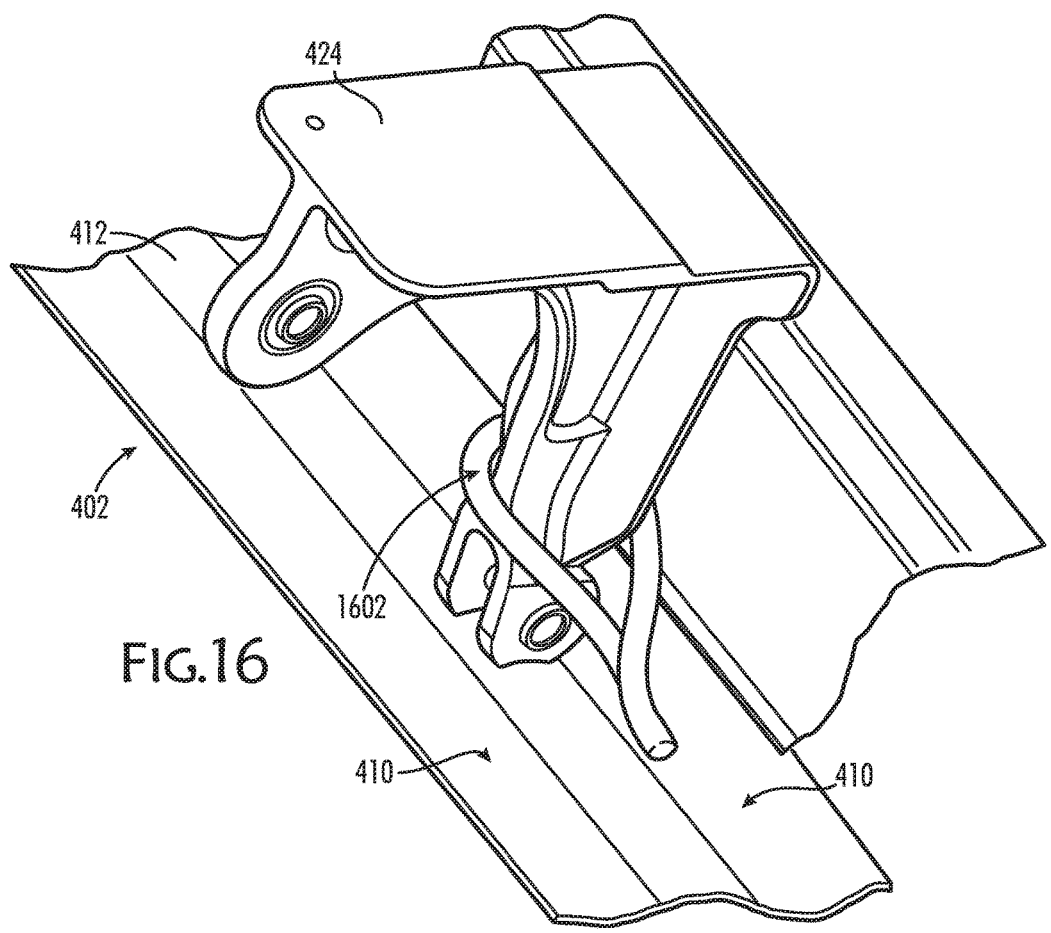
FIG. 16 is a close-up, perspective view of a felt necklace of a moisture diversion system of a moisture diversion system of FIGS. 3 and 4.

FIG. 16 is a close-up, perspective view of a felt necklace 1602 which could be used with any of the moisture diversion systems 300, 400, 1700, 1900, 2000 described herein. In some aspects, a wicking structure, such as the felt necklace 1602, is used to directly wick moisture into the drip shield 402. For example, the felt necklace 1602 is placed in fluid communication with a fitting 424 such that moisture dripping down the fitting 424 is wicked up by the felt necklace 1602 and into the drip shield 402. It should be understood that any wicking substance could be used to perform the described task, even though moisture wicking felt is used as an example herein.

Figure 17:
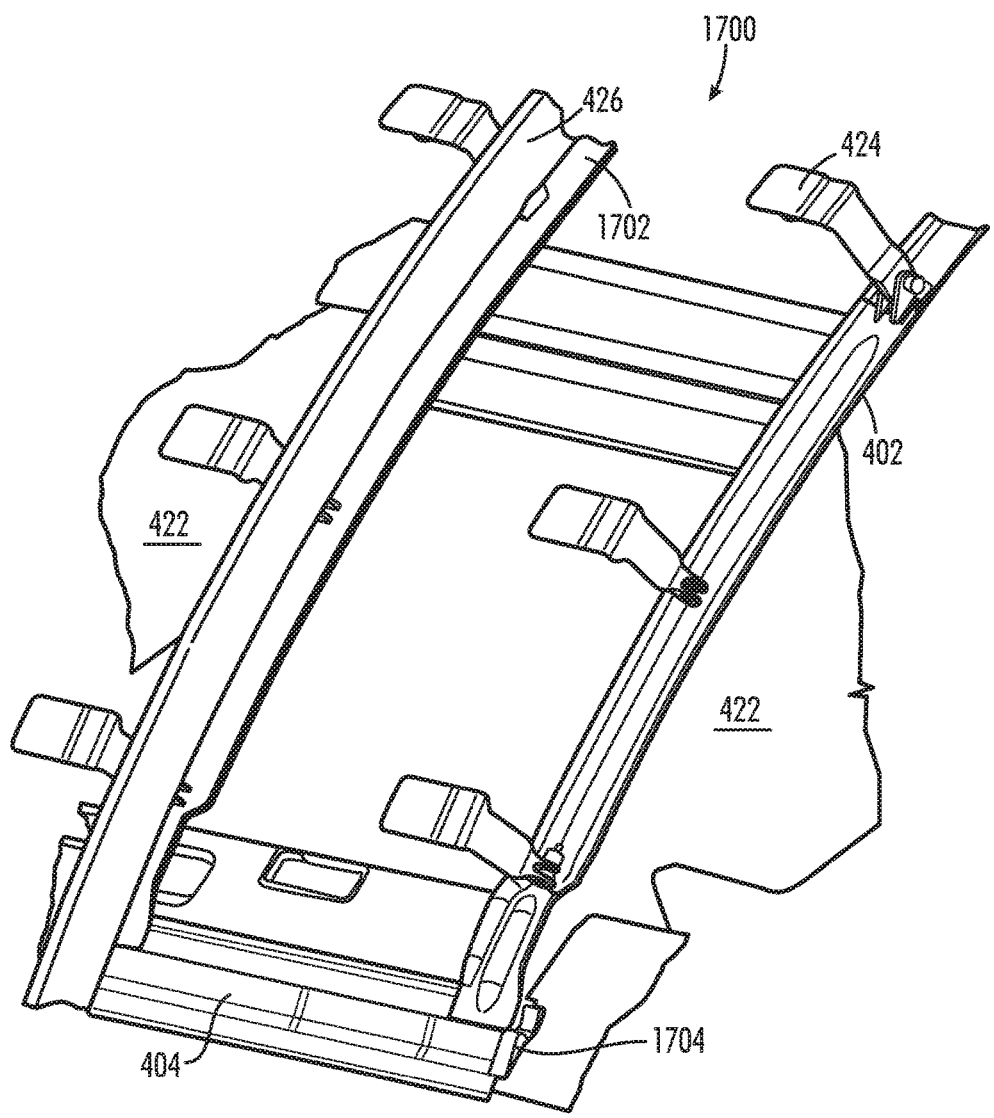
FIG. 17 is perspective view of a moisture diversion system including at least one one-piece drip shield.

FIG. 17 is perspective view of an exemplary moisture diversion system 1700 including at least one one-piece drip shield 1702. In some aspects, at least one one-piece drip shield 1702 is used in a moisture diversion system, for example where there aren't fittings that need to be accounted for (that are passing through the drip shield) and/or in situations where the moisture diversion system is not being retrofitted into an aircraft. As shown in FIG. 17, the one-piece drip shield 1702 can be installed between the strongbacks 422 because there are no fittings 424 which are needed for attaching the strongbacks 422 to a frame member 426 or stringer, unlike with the three-piece drip shield 402 that is shown installed at the strongback 422 location.

In an aspect, at least one drain stop 1704 is provided to a trough 404 in order to stop moisture flow within the trough 404 at that specific point. In an aspect, the drain stop 1704 is situated onto at least one of the outboard wall 1102 and the inboard wall 1104 of the trough 404 such that the drain stop 1704 extends down into the liquid conduit 1106 to obstruct moisture flow within the liquid conduit 1106. The drain stop 1704 could conceivably be used with any of the moisture diversion systems described herein. In some aspects, the drain stop 1704 does not completely obstruct flow, but merely limits it, for example to provide overflow for an adjacent trough if the moisture level within the adjacent trough rises to an undesirable level.

Figure 18:
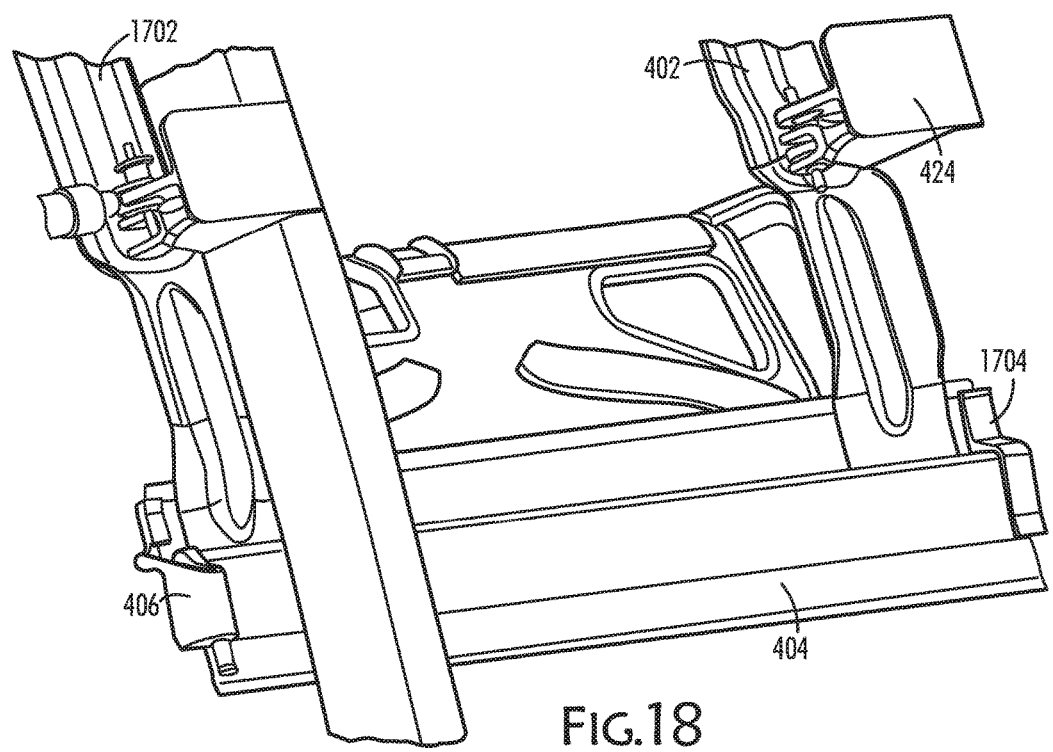
FIG. 18 is a perspective view of a lower portion of a one-piece drip shield of a moisture diversion system of FIG. 17.

FIG. 18 is a perspective view of a lower portion of a one-piece drip shield 1702 of a moisture diversion system 1700, which also shows the at least one drain stop 1704 in additional detail.

Figure 19:
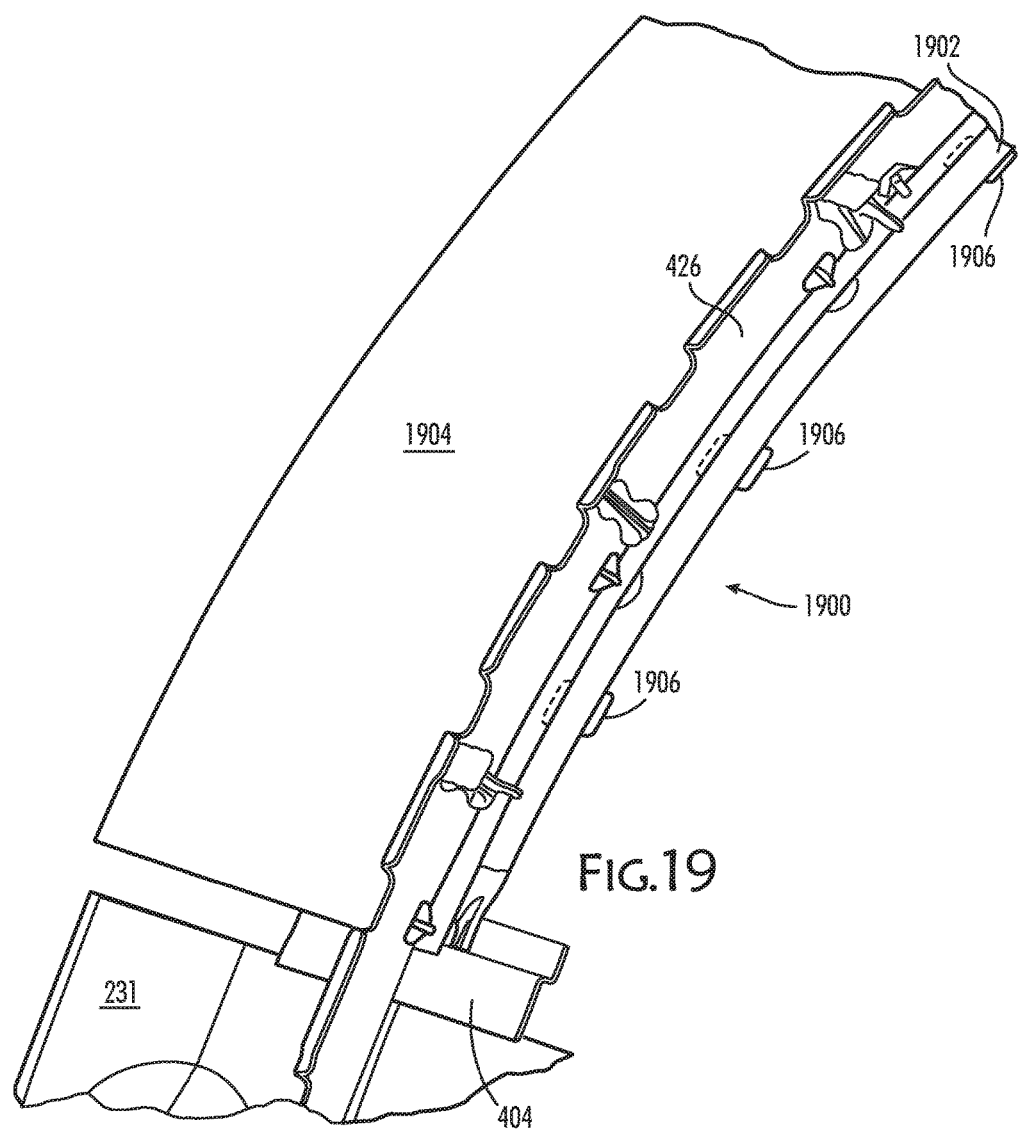
FIG. 19 is a perspective view of a moisture diversion system attached to an exemplary insulation blanket.

FIG. 19 is a perspective view of an exemplary moisture diversion system 1900, where the drip shield 1902 is configured to attach to an exemplary insulation blanket 1904, where the insulation blanket 1904 is correspondingly configured to attach to the drip shield 1902. For clarity, only one insulation blanket 1904 is shown. In an aspect, the moisture diversion system 1900 is not merely located under the insulation blanket/layer 1904, but is additionally directly attached to each insulation blanket 1904. The ends of the insulation blanket 1904 include fasteners 1906 which attach the ends of each insulation blanket to a drip shield 1902 which includes counterpart fasteners, for example a hook and loop fastening system.

Figure 20:
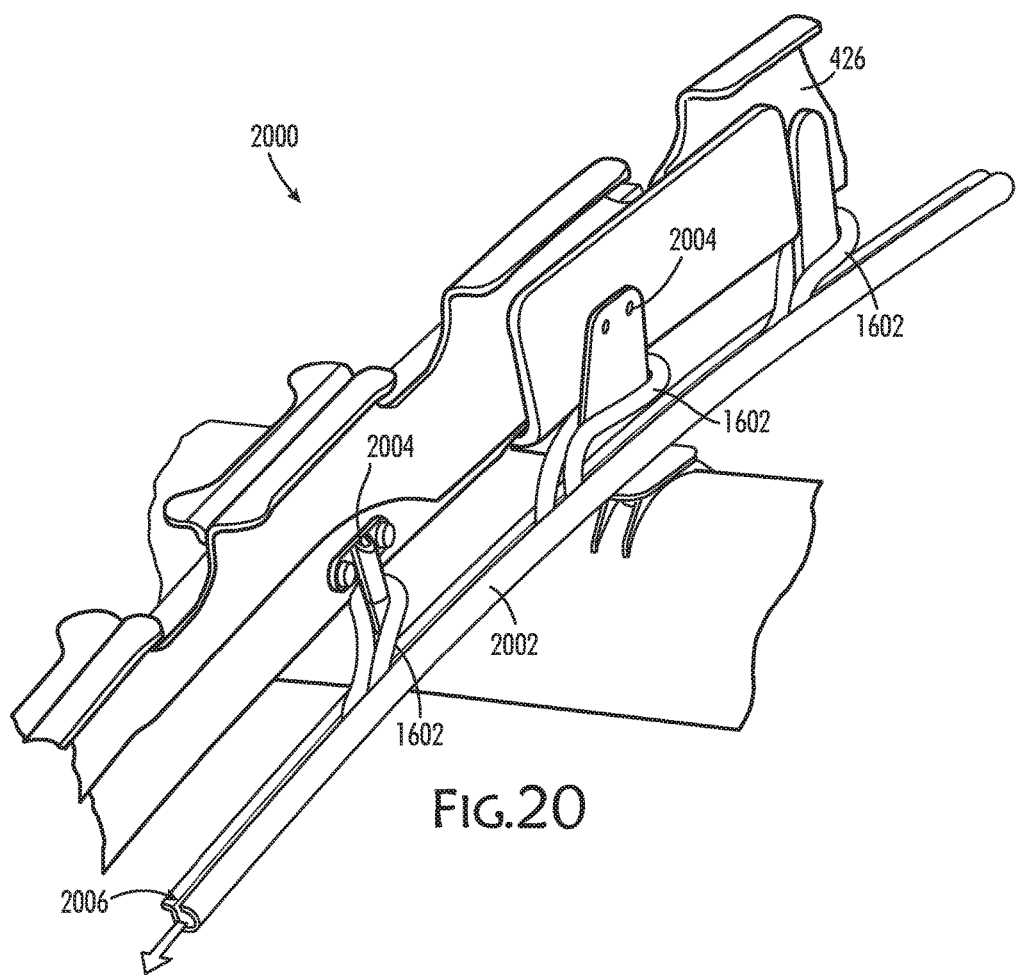
FIG. 20 is a perspective view of a crown-based moisture diversion system.

FIG. 20 is a perspective view of a moisture diversion system 2000 which, in an aspect, is used in the crown of an aircraft fuselage where there are many internal structures 2004, such as brackets and fittings attached to frame members 426, creating relatively tight spaces and many gaps in the insulation layer 220 where they pass through. The moisture diversion system 2000 includes a drip shield 2002 which is substantially tubular but with a slot 2006 opening for capturing moisture dripping from the internal structures 2004, where the slot 2006 is positioned under the internal structures 2004 to capture dripping moisture. A tubular design is used, in some aspects, because it can be compact and/or exhibit excellent moisture containment characteristics. In some aspects, at least one wicking necklace 1602 is used to wick moisture away from the internal structures 2004 and into the drip shield 2002, optionally into the slot 2006. Additionally, the drip shield 2002 can be provided with a flange, or flat surface, for adhering the wicking necklace 1602 thereto, thereby securing the relationship of the wicking necklace 1602 to the drip shield 2002. Optionally, the moisture diversion system 2000 uses multi-segment drip shields like those described elsewhere herein, which are installed piece-by-piece between the internal structures 2004.

Figure 21:
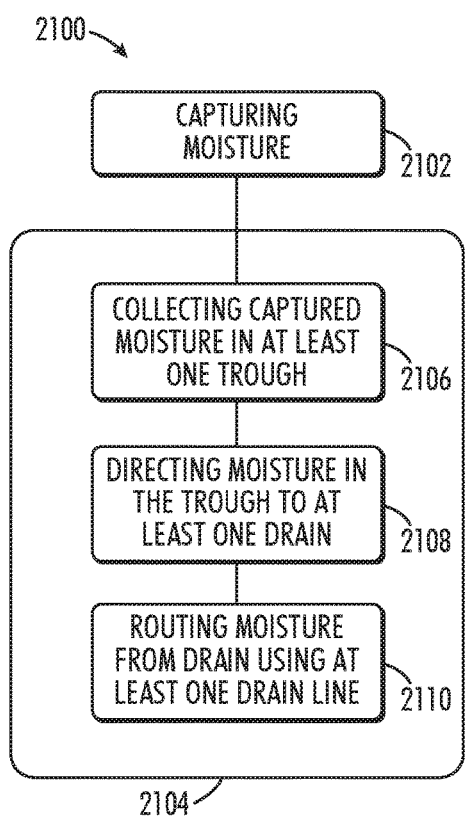
FIG. 21 is a flowchart of a method of using a moisture diversion system of a moisture diversion system of FIGS. 3, 4, 17, 19 and 20.

FIG. 21 is a flowchart 2100 of a method of using a moisture diversion system, such as any of the moisture diversion systems 300, 400, 1700, 1900, 2000 described herein. At least one drip shield 302 of the moisture diversion system 300 is installed in a moisture capturing location, for example under a gap in an insulation blanket. Moisture dripping through the gap is captured (2102) by the drip shield 302 and is transported (2104) by at least the drip shield 302 away from the passenger cabin 230. In some aspects, at least one trough 304 collects (2106) moisture captured (2102) by the drip shield 302 to transport (2104) the moisture away from the passenger cabin 230. Optionally, moisture in the trough is directed (2108) to at least one drain 306 to transport (2104) the moisture away from the passenger cabin 230. In some aspects, the at least one drain 306 is connected to a drain line 308 to route (2110) the moisture away from the passenger cabin 230. It should be understood that one or some of these actions can be performed separately and/or optionally.

The terms "comprises", "comprising", "includes", "including", "having" and their conjugates mean "including but not limited to".

The term "consisting of" means "including and limited to".

The term "consisting essentially of" means that the composition, method or structure may include additional ingredients, steps and/or parts, but only if the additional ingredients, steps and/or parts do not materially alter the basic and novel characteristics of the claimed composition, method or structure.

As used herein, the singular form "a", "an" and "the" include plural references unless the context clearly dictates otherwise. For example, the term "a compound" or "at least one compound" may include a plurality of compounds, including mixtures thereof.

Throughout this application, various aspects of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range. Further, described ranges are intended to include numbers outside any range described within statistical error and/or inherent measurement equipment limitations.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the disclosure, which are, for clarity, described in the context of separate aspects, may also be provided in combination in a single aspect. Conversely, various features of the disclosure, which are, for brevity, described in the context of a single aspect, may also be provided separately or in any suitable subcombination or as suitable in any other described aspect of the disclosure. Certain features described in the context of various aspects are not to be considered essential features of those aspects, unless the aspect is inoperative without those elements.

Although the disclosure has been described in conjunction with specific aspects thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A moisture diversion system of an aircraft for capturing moisture from at least one internal aircraft structure or at least one gap, the moisture diversion system comprising:
a drip shield with an upper surface having a concave shape, at least one moisture channel disposed in the upper surface of the drip shield, the drip shield being in a moisture capturing orientation under the at least one internal aircraft structure or the at least one gap; and
a trough comprising an outboard wall and an inboard wall, the outboard wall and the inboard wall defining a recessed liquid conduit therebetween, the trough disposed substantially perpendicular to, and in fluid communication with, a lower segment or a bottom portion of the drip shield.

2. The moisture diversion system according to claim 1, further comprising a drain coupled in fluid communication with the trough, the drain including a drain aperture extending into the liquid conduit to draw moisture from the liquid conduit into the drain.

3. The moisture diversion system according to claim 2, further comprising a drain tube connected in fluid communication to the drain for routing moisture away from a passenger cabin of the aircraft.

4. The moisture diversion system according to claim 1, further comprising a drain stop disposed on at least one of the outboard wall and the inboard wall of the trough such that the drain stop extends down into the liquid conduit to obstruct moisture flow within the liquid conduit.

5. The moisture diversion system according to claim 1, wherein the at least one moisture channel comprises a plurality of moisture channels, the system further comprising a central bead disposed between two moisture channels of the plurality of moisture channels.

6. The moisture diversion system according to claim 1, further comprising a central bead defined on the upper surface of the drip shield, the central bead comprising a first central bead portion and a second central bead portion, wherein a break is between the first central bead portion and the second central bead portion.

7. The moisture diversion system according to claim 1, further comprising at least one joggle in the drip shield.

8. The moisture diversion system according to claim 1, wherein the drip shield is tubular shaped and includes an open slot facing the at least one internal aircraft structure or at least one gap.

9. The moisture diversion system according to claim 1, further comprising a wicking necklace disposed in fluid communication with the at least one internal aircraft structure or at least one gap and the drip shield, the wicking necklace configured to wick moisture from the at least one internal aircraft structure or at least one gap into the drip shield.

10. The moisture diversion system according to claim 1, wherein the drip shield comprises a plurality of segments.

11. The moisture diversion system according to claim 10, wherein the drip shield comprises an upper segment, a middle segment, and a lower segment.

12. The moisture diversion system according to claim 11, further comprising a hole disposed in a junction of two of the segments for passage of an internal aircraft structure therethrough.

13. The moisture diversion system according to claim 12, wherein a bead extends around the hole.

14. The moisture diversion system according to claim 11, further comprising at least one slot disposed in the upper segment for mounting the drip shield to a second internal aircraft structure.

15. The moisture diversion system according to claim 14, further comprising at least one snap flange disposed on the at least one slot and biased upwardly, the at least one snap flange configured to snap the upper segment onto the second internal aircraft structure.

16. The moisture diversion system according to claim 10, wherein at least two of the plurality of segments are attached together.

17. The moisture diversion system according to claim 1, wherein the drip shield includes fasteners to fasten the drip shield directly to an insulation blanket.

18. A method of using a moisture diversion system for capturing moisture from an internal aircraft structure using at least one drip shield in a moisture capturing location relative to the internal aircraft structure, the method comprising:

capturing moisture from the internal structure in the at least one drip shield; and, diverting the captured moisture away from a central bead and into first and second moisture channels that extend along opposing sides of the central bead and transporting the captured moisture in the at least one drip shield.

19. The method of using a moisture diversion system of claim 18, further comprising:

collecting captured moisture in a trough comprising an outboard wall and an inboard wall, the outboard wall and the inboard wall defining a recessed liquid conduit therebetween, the trough disposed substantially perpendicular to, and in fluid communication with, a lower segment or a bottom portion of the drip shield;

directing moisture in the trough to at least one drain, the drain coupled in fluid communication with the trough and including a drain aperture extending into the liquid conduit to draw moisture from the liquid conduit into the drain; and routing moisture from the drain to a drain tube connected in fluid communication to the drain for routing moisture away from a passenger cabin of the aircraft.

\* \* \* \* \*